(12) United States Patent
Wichmann

(10) Patent No.: US 7,788,793 B2
(45) Date of Patent: Sep. 7, 2010

(54) METHOD FOR PRODUCING A BROADBAND ANTENNA

(75) Inventor: Gunter Wichmann, Heidelberg (DE)

(73) Assignee: Niitek, Inc.

( * ) Notice: Subject to any disclaimer, the term of this patent is extended or adjusted under 35 U.S.C. 154(b) by 0 days.

(21) Appl. No.: 11/292,433

(22) Filed: Dec. 2, 2005

(65) Prior Publication Data

US 2008/0092364 A1    Apr. 24, 2008

Related U.S. Application Data

(62) Division of application No. 10/664,047, filed on Sep. 16, 2003, now Pat. No. 7,042,385.

(51) Int. Cl.
*H01P 11/00* (2006.01)

(52) U.S. Cl. ............... 29/600; 29/592.1; 342/22; 343/770

(58) Field of Classification Search ........... 29/600, 29/602.1, 830–834, 593–594; 343/895, 702, 343/900; 455/575.1, 575.7, 558, 90; 340/572.1; 342/22, 27, 195
See application file for complete search history.

(56) References Cited

U.S. PATENT DOCUMENTS

| | | | | |
|---|---|---|---|---|
| 2,454,766 A | * | 11/1948 | Brillouin | 343/773 |
| 3,599,214 A | * | 8/1971 | Altmayer | 343/713 |
| 3,750,185 A | * | 7/1973 | Evans | 343/814 |
| 4,303,489 A | * | 12/1981 | Morrison, Jr. | 204/192.12 |
| 5,396,658 A | * | 3/1995 | Hwu et al. | 455/327 |
| 5,523,760 A | | 6/1996 | McEwan | 342/89 |
| 5,748,153 A | * | 5/1998 | McKinzie et al. | 343/767 |
| 5,838,285 A | * | 11/1998 | Tay et al. | 343/895 |
| 6,052,889 A | * | 4/2000 | Yu et al. | 29/600 |
| 6,094,179 A | * | 7/2000 | Davidson | 343/895 |
| 6,188,364 B1 | * | 2/2001 | Scordilis | 343/702 |
| 6,198,454 B1 | * | 3/2001 | Sharp et al. | 343/773 |
| 6,266,538 B1 | * | 7/2001 | Waldron | 455/575.7 |
| 6,344,830 B1 | * | 2/2002 | Taylor | 343/767 |
| 6,356,240 B1 | * | 3/2002 | Taylor | 343/767 |
| 6,445,334 B1 | | 9/2002 | Bradley et al. | 342/22 |
| 6,538,614 B2 | * | 3/2003 | Fleming et al. | 343/767 |

(Continued)

FOREIGN PATENT DOCUMENTS

DE    42 34 559    3/1994

(Continued)

OTHER PUBLICATIONS

Whitely et al., "50 GHz Sampler Hybrid Utilizing A Small Shockline and An Internal SRD" *IEEE MTT-S Digest*, pp. 895-898, Copyright 1991.

(Continued)

*Primary Examiner*—Minh Trinh
(74) *Attorney, Agent, or Firm*—Sunstein Kann Murphy & Timbers LLP (57) ABSTRACT

A method for manufacturing a broadband antenna, such as applicable for a low radar cross-section ground penetrating radar. A conductive film is deposited along a dielectric member, such as by sputtering, in such a manner that the impedance of the conducting film is a continuous function of length along the dielectric member. A sampling circuit is then coupled electrically to the feedpoint.

3 Claims, 6 Drawing Sheets

U.S. PATENT DOCUMENTS 6,879,849 B2 * 4/2005 Begic ................. 455/575.7
6,967,624 B1 * 11/2005 Hsu et al. ................. 343/770

FOREIGN PATENT DOCUMENTS

DE 33 16 937 4/1996

OTHER PUBLICATIONS

Wichmann, G., "*Research and Development on the Field of Mine Detection*", European Research Office of the U.S. Army, Oct. 1996.

Æther Wire & Location, Inc., "*The Origins of Ultra-Wideband Technology*", May 1998.

Tantum et al., "*ATR Algorithm Performance for the BRTC Wichmann Ground Penetrating Radar System*", Department of Electrical and Computer Engineering, Duke University, UXO Forum '99 Proceedings.

Daniels, D., "*An Overview of RF Sensors for Mine Detection: Part 3 Radar*", ERA Technology Ltd., 1999.

Andrews et al., "*Research On Ground-Penetrating Radar for Detection of Mines and Unexploded Ordnance: Current Status and Research Strategy*", Institute for Defense Analyses, Dec. 1999.

Celia Home Page, Case Study- Resistive Vee Dipole Mine Detection.

Montoya et al., "*Land Mine Detection Using a Ground-Penetrating Radar Based on Resistively Loade Vee Dipoles*", IEEE Transactions on Antennas and Propagation, vol. 47, No. 12, Dec. 1999.

Schukin et al., "*Evolution of GPR Antennas, Pulse Generators and Sample Recorders*", www.irctr.tudelft.nl/gpr/PDF/Publications/2000/gpr2000_p3_2.PDF.

Sachs et al., "Ultra-Wideband Principles for Surface Penetrating Radar", *Ultra-Wideband, Short-pulse Electromagnetics 5*, May 31-Jun. 2, 2000.

Fontana et al., "*An Ultra Wideband Radar for Micro Air Vehicle Applications*", IEEE Conference on Ultra Wideband Systems and Technologies, May 2002.

Noon et al., "*Subsurface Remote Sensing*", The Review of Radio Science, 1999-2002, IEEE Press (2002).

"*Subsurface Sensing Lab: Single Chip Sequential Sampling Receiver*", University of Houston, Dec. 9, 2002.

"*Subsurface Sensing Lab*", University of Houston, Mar. 11, 2003.

"*Low-Power, Miniature, Distributed Position Location and Communication Devices Using Ultra-Wideband, Nonsinusoidal Communication Technology*", Æther Wire Location, Inc., 2003.

Montoya, T., "*Vee Dipole Antennas for use in Short-Pulse Ground—Penetrating Radars*," A Thesis Presented to The Academic Faculty, Georgia Institute of Technology, Mar. 1998. (*Please see enclosed CD*).

Kim, et al., "*Design and Realization of a Discretely Loaded Resistive Vee Dipole on a Printed Circuit Board*," Proc. of SPIE, vol. 5089, pp. 818-829, 2003.

Kim, et al., "*Design and Realization of a Discretely Loaded Resistive Vee Dipole for Ground-Penetrating Radars*," Radio Sciences, vol. 39, RS4S03, pp. 1-9, Jul. 2004.

\* cited by examiner

METHOD FOR PRODUCING A BROADBAND ANTENNA

The present invention is a divisional application of U.S. patent application Ser. No. 10/664,047, filed Sep. 16, 2003, and now issued as U.S. Pat. No. 7,042,385.

TECHNICAL FIELD

The present invention pertains to a high-bandwidth and high-frequency non-intrusive inspection radar system, and, more particularly, to a radar system having features providing for a low self-signature, referred to, herein, as a low radar cross section (LRC).

BACKGROUND ART

Very high-frequency emitting radar antennas have been used in the detection of land mines or other concealed objects. As used herein, the term 'very high frequency' refers to radar systems employing at least some frequency components in a range in excess of 30 MHz. Moreover, while radar systems, and the invention described herein, may advantageously be employed for a wide variety of non-intrusive inspection (NII) applications; including, without limitation, narcotics detection, bomb detection, buried cable and pipe detection, motion detection, corpse detection, see-through-the wall technology, archaeology, geophysics, etc., the invention is described, herein, in terms of a ground-penetrating radar (GPR) system for the detection of landmines, with no intent of limitation.

In certain applications, such as those of GPR, proximity of the emitting antenna to the ground is known to be beneficial (particularly, proximity on the order of 30 centimeters or less) by virtue of reducing radar footprint on the ground and thereby improving the intensity of the signal that is reflected by the buried object. However, when the antenna is located near the ground or other objects, undesired reflections may appear between the antenna and the ground or other objects. Multiple reflections result in interference referred to as "clutter". These multiple reflections are primarily a function of the following: distance between the antenna and the ground, the presence of other objects in the vicinity of the antenna, roughness of the terrain, the angle of the antenna, and the radar reflectivity of the antenna and its components. These multiple reflections interfere and mask the reflected signatures of the buried objects and are referred to as 'clutter'. It is extremely beneficial to have system components that minimize this clutter.

SUMMARY OF THE INVENTION

In accordance with embodiments of the invention, methods are provided for manufacturing a broadband antenna that include depositing a conductive film along a dielectric member in such a manner that the impedance of the conducting film is a continuous function of length along the dielectric member, and electrically coupling a sampling circuit to the conducting film at a feedpoint of the broadband antenna. The step of depositing a conductive film may include sputtering a resistive layer of a conducting metal.

In accordance with other embodiments of the invention, a receiver is provided for an impulse radar system that is characterized by a strobe pulse. The receiver has a broadband antenna having a feed, and a low-radar cross-section front-end module coupled directly to the feed of the antenna. The front-end module includes only a pulse former, a receiving diode, an integrating element, and a impedance matching element. The receiver has a transmission line having a proximal end coupled to the front-end module and a distal end, and a processor coupled to the distal end of the transmission line for analyzing signals received from the front end module. The integrating element may be a capacitor, and the broadband antenna may be characterized by a resistivity per-unit-length where the resistivity per-unit-length increases with distance from the feed. More particularly, the resistivity per-unit-length may increase linearly with distance from the feed.

BRIEF DESCRIPTION OF THE DRAWINGS

The foregoing features of the invention will be more readily understood by reference to the following detailed description, taken with reference to the accompanying drawings, in which:

FIG. 1A depicts one embodiment of a low radar cross section antenna array for deployment on a motorized vehicle in accordance with a preferred embodiment of the present invention, while

DETAILED DESCRIPTION OF SPECIFIC EMBODIMENTS

The problem of multiple reflection clutter-signals, discussed above, is advantageously reduced, in accordance with embodiments of the present invention, by employing antennas having a low radar cross-section, ideally a radar cross section of zero. In accordance with the present invention, a low radar cross section is achieved while retaining an effective search capacity. The antenna's advantages additionally include its cost-effectiveness and its reduced use of materials and production capacity.

Figure 1A:
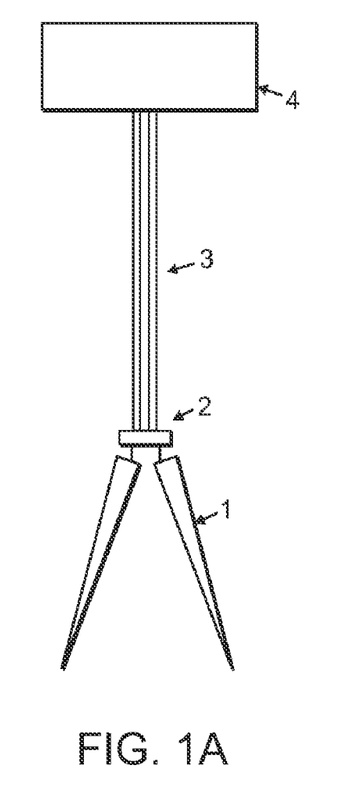
Figure 1B:
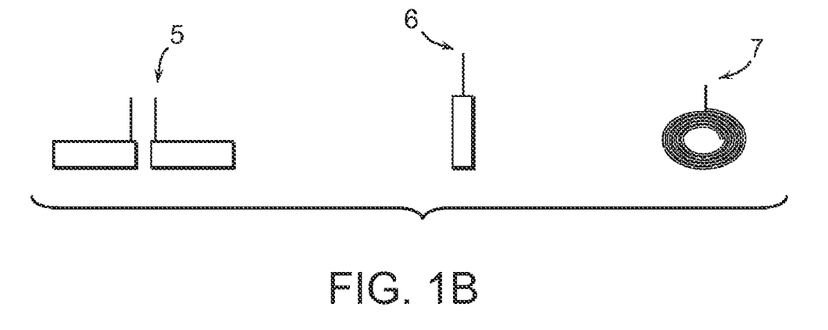
FIG. 1B depicts three alternate antenna configurations.

In accordance with embodiments of the present invention, highly resistive, low-metal-content, antenna arms are employed, as now described with reference to FIG. 1. In preferred embodiments of the invention, a resistive tapered-Vee antenna 1, characterized by low metal content, is employed. In preferred embodiments of the invention, the impedance of the antenna is governed by the deposition, typically by sputtering, of a thin film of conductor, such as gold. This process is preferred due both to the high homogeneity of the resultant impedance and the tailorability of the impedance by prescribing the geometry of the deposited film. In particular, the impedance may be tapered, increasing along each leg of a vee antenna, so as to create a resistively tapered vee (RTV) antenna. The taper is preferably linear, so as to vary impedance gradually, thereby reducing reflection across a broad spectral band. Further description of the use of a resistively tapered vee antenna in mine detection may be found in Montoya et al., "Land Mine Detection Using a Ground-Penetrating radar Based on Resistively Loaded Vee Dipoles", *IEEE Transactions on Antennas and Propagation*, vol. 47, pp. 1795-1806, (December, 1999), which is incorporated herein by reference.

In order to reduce spurious reflections and clutter, preferred embodiments of the present invention relate to transmission line 3, coupling feedbox 2 (which is disposed at the feedpoint of antenna 1) to multiplexer and subsequent processor module 4. In accordance with these embodiments of the invention, transmission line 3, which may include coaxial cables or other transmission media, is rigidly attached to a flat surface so as to maintain transmission line elements in parallelism.

Other antenna configurations, such as a resistive dipole 5, rod 6, spiral 7, or exponential stripline, are all examples within the scope of the present invention as claimed, each exhibiting advantages and disadvantages for application in specified circumstances. The use of the vee configuration of FIG. 1 for both the transmitting and receiving antennas is advantageous for ground penetrating applications because the vee's focus and field of view are primarily into the ground, thereby reducing the signals reflected by the framework that holds the antenna. High resistivity of the antenna may be achieved through use of such resistive materials as carbon, graphite plastic, ceramic, a plastic that is coated with an extremely thin layer of conducting material, or a similarly coated foam material. FIG. 1*a* depicts antennas formed into an array within a structure that may be referred to herein as a 'carcass'.

The antenna arms typically employed in this invention are highly inefficient radiators of signals because they are so highly resistive, having extremely low gain in both transmission and reception. A sampling technology employed in processing the received signals is therefore preferably extremely sensitive. Yet, it is also preferably characterized by an extremely low-radar-cross section so as to minimize clutter caused by components of the antenna structure.

General principles of sampling technology are described, for example, in the Tektronix Technique Primer 47W-7209, October, 1989), incorporated herein by reference. In typical sampling practice, precision is sought in the measurement of voltages versus time value without regard for the radar cross section of the circuitry. As used herein, unless otherwise indicated, the term "precision" will refer to the accuracy to which a voltage is measured at a specified instant with respect to onset of a return pulse.

In accordance with the current invention, innovative sampling technology is employed for the first time that is both extremely sensitive, and that provides a ratio of signal to clutter and of signal to noise that cannot be achieved using methods known in the art. This achievement is made at the expense of 'precision' but precision is less important for non-intrusive inspection system applications. In accordance with techniques of the present invention, the radar cross section of the sampling electronics may advantageously be as much as three orders of magnitude lower that that achieved in prior technology.

Figure 2A:
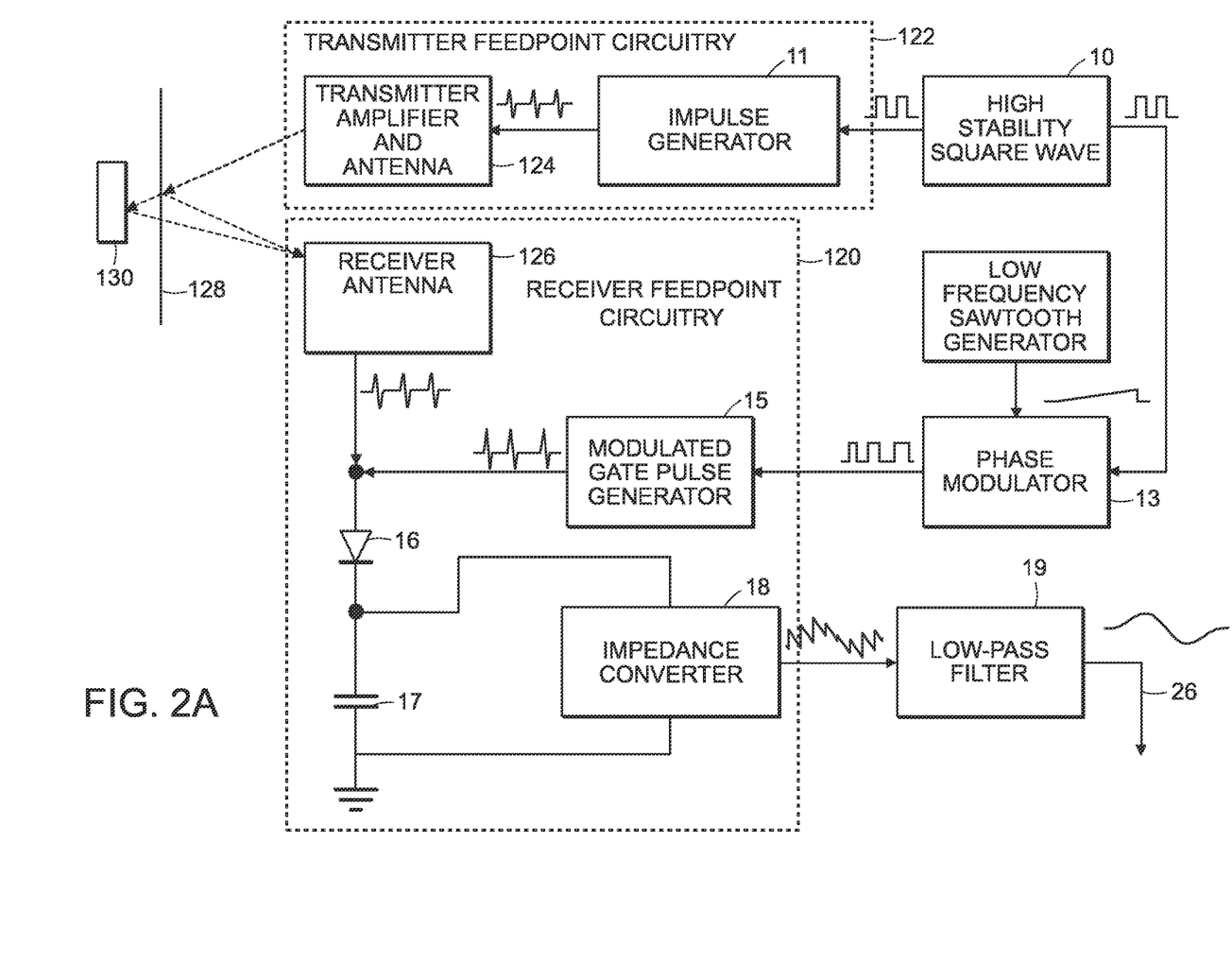
FIG. 2A is a basic circuit block diagram of a low-radar cross-section sampling system in accordance with embodiments of the invention.

Certain features whereby the performance heretofore described may be achieved are now described with reference to FIGS. 2A, 2B, and 3. As shown in FIG. 2A, a capacitor 17 is connected to receiving diode 16 and is used as an integrator. Use of a minimal number of components, coupled with subminiature surface-mounting technology allows a smaller cross-section than may be achieved using known technology. No separate source of voltage for biasing the receiving diode is necessary since the synchronous input is DC-coupled and biased to the requisite level externally to the sampling circuit that is located at the antenna feed.

Figure 2B:
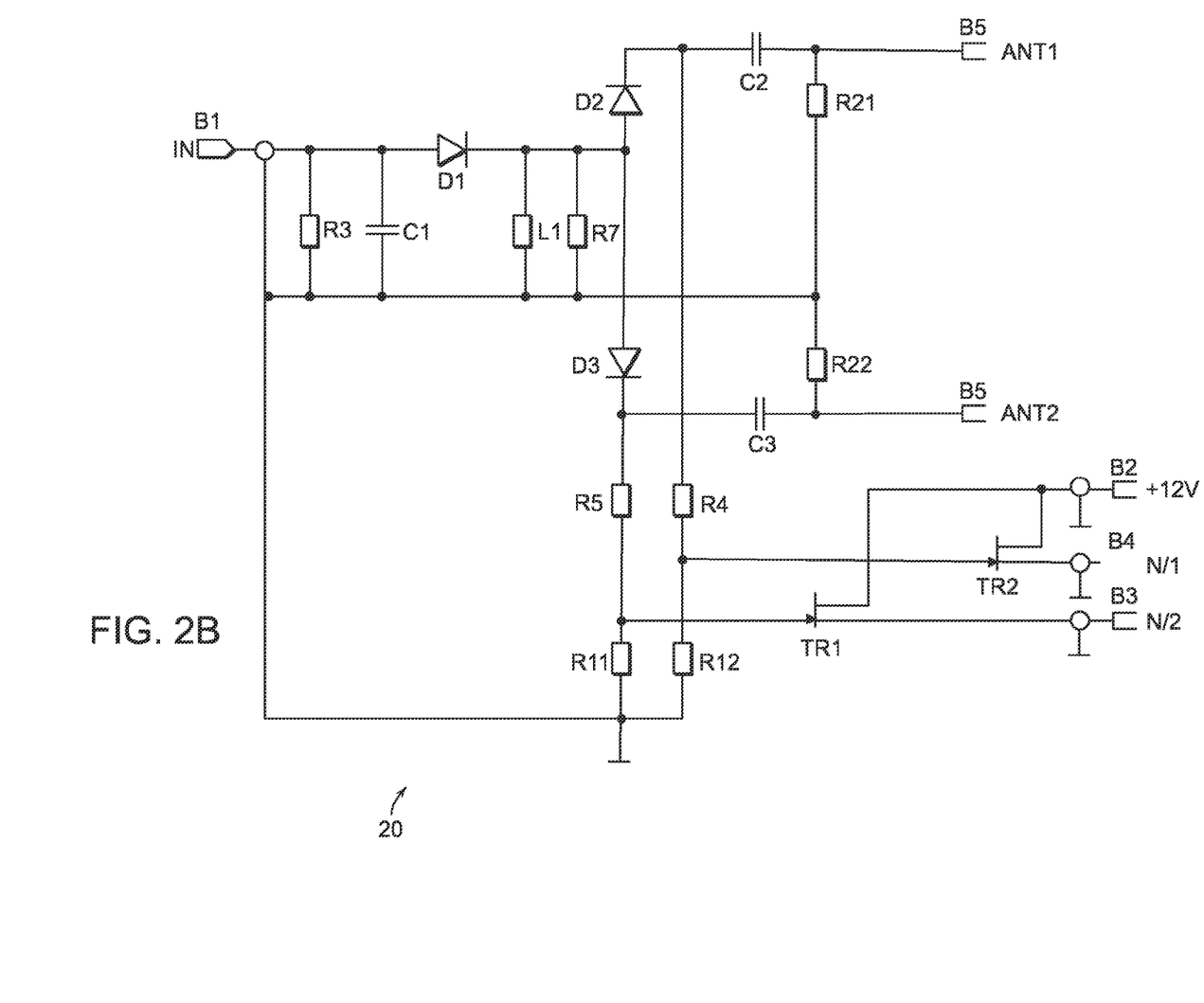
FIG. 2B is a circuit diagram of a low-radar cross-section sampling system showing components located at the antenna feed in accordance with an embodiment of the invention.

In accordance with the present invention, the pulse input to the sampling circuit 20 of FIGS. 2A and 2B is provided on-board a receiver feedpoint circuitry board 120 by circuitry referred to herein as a 'pulse former.' The pulse former includes a modulated gate pulse generator 15 that uses, in certain embodiments, a simple low-component count step-recovery diode (SRD) method. Thus, the pulse input need be merely a modulated square wave. A step-recovery diode D1 (shown in FIG. 2B) conducts briefly in the reverse direction and then cutoff abruptly, allowing for the generation of extremely sharp pulse edges. Shunt inductance L1 (shown in FIG. 2B) further sharpens the leading edges of the pulses used to strobe the sampling gate. Use of an SRD for pulse generation in a sampling context is described, for example, by Whitelely, et al., "50 GHz Sampler Hybrid Utilizing a Small Shockline and an Internal SRD," *IEEE Microwave Theory & Technique-S Digest*, pp. 895-898 (1991), incorporated herein by reference. Thus, neither a bias voltage nor amplifiers and associated components are provided at the feedpoint. In their place are FET transistors T1 and T2 (shown in FIG. 2B) which typically exhibit no voltage gain and act as impedance converters, taking the high source impedance of diode 16 and capacitor 17 and provide a low source impedance for transmission away from the feedpoint to the input, at the multiplexer box at a remote location, of the differential amplifiers.

A trigger generator, such as square wave trigger generator 10, triggers generation of a pulse by a high-bandwidth signal generator 11. The bandwidth of the system is limited by a convolution of the bandwidths of the transmitted impulse signal, the bandwidth of the resistive antennas, and the bandwidth of the receiver circuitry. The probe pulses, amplified and transmitted by the transmitter amplifier and antenna 124 are propagated into the transfer medium, which includes the air, the ground 128, and any potential targets 130. Both impulse generator 11 and transmitter amplfer 124 together constitute the transmitter feedpoint circuitry 122. The high frequency signal received by antenna 126 is attenuated (due primarily to $\sim r^{-2}$ decrement of both radiated flux and antenna sensitivity) and contains noise (typically dominated, in a well-designed system, by ambient electromagnetic radiation sources, whether natural or man-made, or due to thermal noise generation within the system).

Phase modulator 13 is also triggered by the square wave generator 10. A low-frequency sawtooth generator 14 feeds the phase modulator 13, with the sawtooth waveform controlling the depth of modulation. A modulated impulse converter 15 takes the modulated square waves and converts them to modulated impulses. Upon reception of the pulses returned through transfer medium 12, capacitor 17 becomes charged by the signal that is passed by the receiving diode 16. Impedance match 18 couples prior parts of the circuit to low-pass filter and amplifier 19 that outputs the low-frequency representation of the high bandwidth signal with a high signal to noise and clutter ratio.

Figure 3:
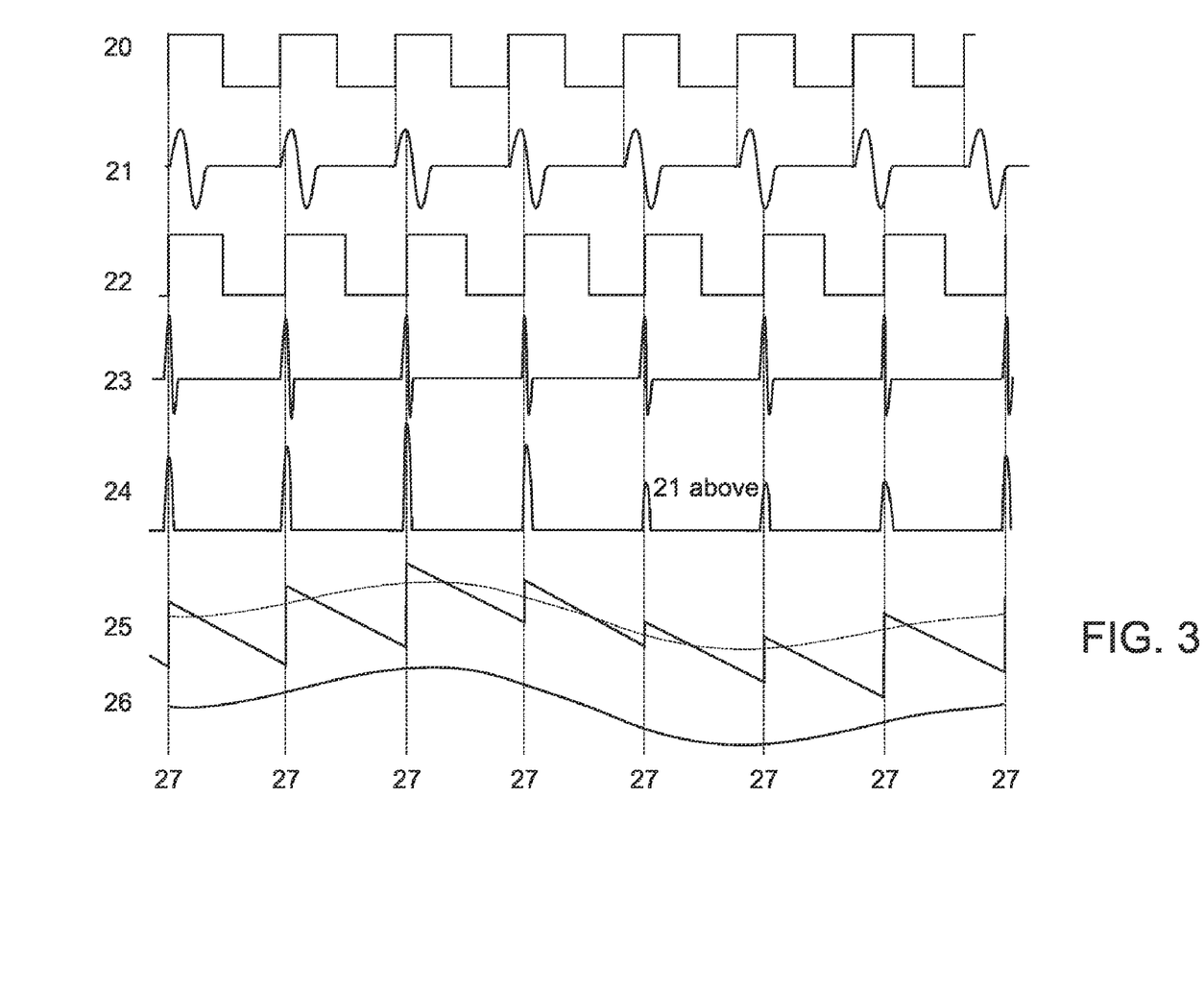
FIG. 3 depicts impulse and signal trains in accordance with the embodiment of FIG. 2.

Referring now to FIG. 3, the square wave output 20 of square wave generator 10 simultaneously triggers the high-bandwidth semiconductor-based signal source 11 and the signal phase modulator 13. While the sawtooth wave has a period that is equal to the low frequency representation of the received signal, during one period of the sawtooth wave, there are thousands of transmitted and received impulses. The time between the receiver trigger impulses is related to the instantaneous voltage of the sawtooth wave during that impulse. This causes the modulation and allows the high frequency signal to be sampled and "stretched out" into the low frequency representation. The low frequency sawtooth generator 14 causes the signals in phase modulator 13 to be repeatedly and incrementally stretched in time by fractions of the signal source's 10 period. The control signal for the modulation of the signal 20 generates the modulated square wave signal 22.

At the same time, the generated drive voltage 10 is led to the phase modulator stage 13 which is also fed by a low frequency sawtooth signal 14. Both signals are processed by the phase modulator stage 13 such that their output shows a rectangular voltage resembling that generated at 10 but with modulation, where this modulation or slight delay is a very small fraction of the signal source's period 11.

Modulated square wave 22 is converted by the modulated impulse converter 15 to a modulated strobe pulse 23. Modulated strobe pulse 23, in turn, is added to the signal 21 received from the antenna arms, with the modulated strobe pulse acts as a sampler, and is fed to the receiving diode 16. Receiving diode 16 passes some portion of this combined voltage 24, where the combined voltage is the modulated strobe pulse 23 plus the sampled points of the high bandwidth signal 21.

The sampled portions of the received signal 21 are located in the illustration by the dotted lines 27 that intersect with the high-bandwidth signal 21. The passed signal 24 charges the capacitor 17. This signal across the capacitor 17 is coupled to subsequent amplifiers and electronics by means of impedance matcher 18. In a preferred embodiment of the invention, impedance matcher 18 is a field-effect transistor (FET) that presents a very high impedance input to avoid attenuating the extremely high source impedance received signal. The FET transmits a low source impedance signal to outputs B3, B4, and up a coaxial cable (not shown) to subsequent low input impedance amplifiers 19 in order to reduce noise during this transmission. The resulting charge and discharge produces the saw-tooth-like wave signal 25. The dotted line over the saw-tooth-like wave 25 is produced by the amplifier 19, which also filters out the high frequency saw tooth. The resulting signal 26 is a low frequency representation of the high-bandwidth signal 21.

This sampling technology is by its nature well-suited to make low radar cross-section, since only a minimal number of components are disposed on a printed circuit board at the feed point of antenna arms 2. Only the modulated impulse converter 15, the receiver diode 16, the integrating capacitor 17, and impedance matcher 18, along with associated passive components, are disposed at the antenna feed, whereas all prior art sampling receivers have incorporated these components integrally with the receiver that has included amplification and multiplexing electronics. The pulse generator 15 is integrally co-located with the sampling circuitry to eliminate problems associated high frequency/high bandwidth transmission lines. Moreover, the steepness of the leading edge of the strobe pulse, received at input B1, is steepened by shunting with inductor L1 (shown in FIG. 2B). This provides a greater bandwidth than would be provided if the strobe pulse were to be generated remotely and transmitted to the sampling circuit at the antenna feed by means of a transmission line.

The prior paragraphs describe the receiving antenna. Preferred embodiments of the current invention also includes a low radar cross-section transmitter. The transmitter antenna 124 and its feedpoint circuitry 122 are made low radar cross section by moving only a small semiconductor-based pulse generator 11 at the feed point of the antenna arm 1 or arms, depicted by module 2 of FIG. 1.

As shown in FIG. 2B, some embodiments of the present invention remain LRC but are improved with a push-pull arrangement that replaces the diode 16 and capacitor 17 with the respective pairs D1/C2 and D3/C3. This advantageously further reduce the signal to noise ratio. In this embodiment as well, only these components which are necessary at the feedpoint are disposed there, thereby advantageously providing a minimal radar cross section.

Figures 4A, 4B:
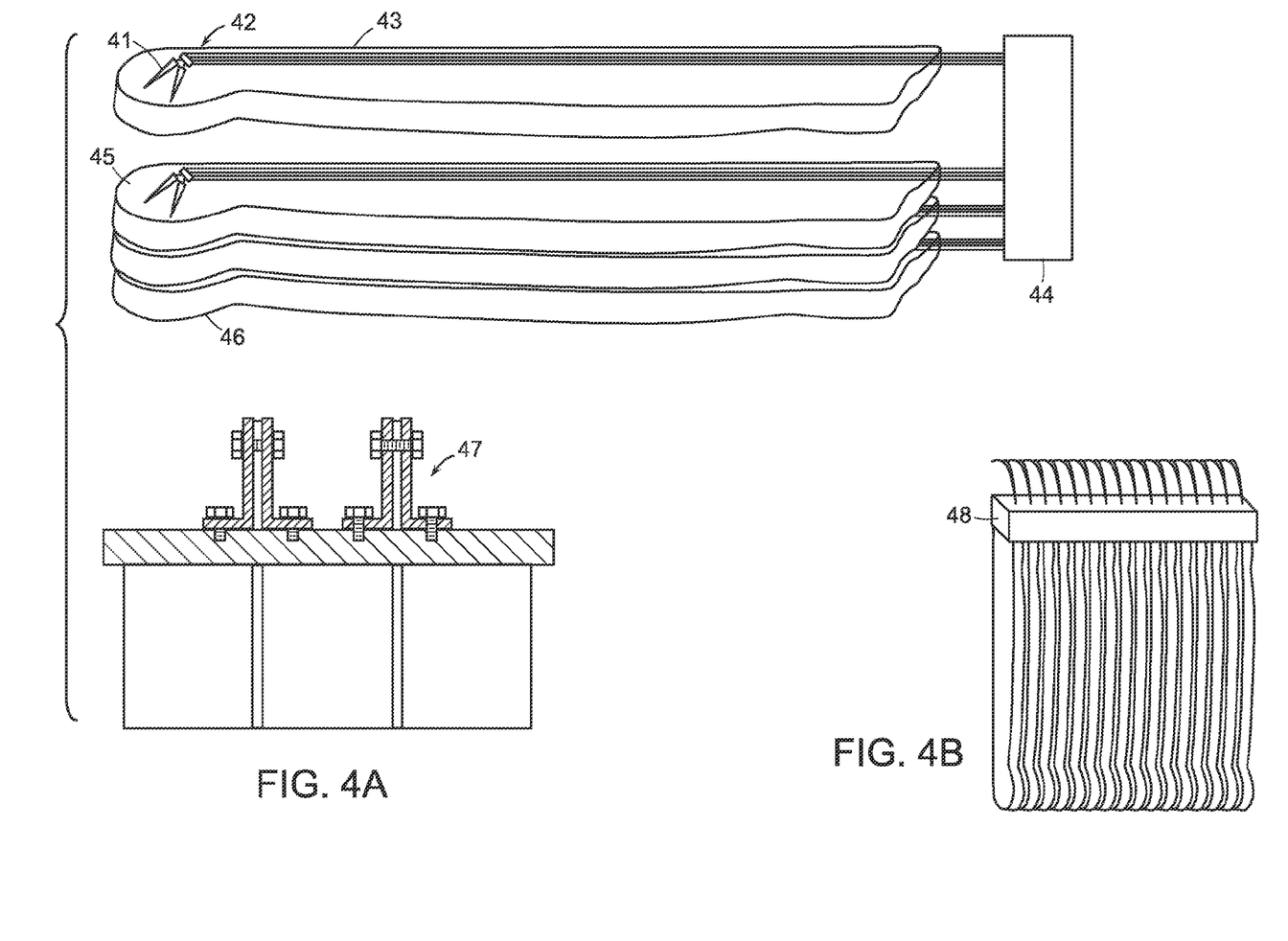
FIGS. 4A and 4B depict the construction of an antenna array, in accordance with embodiments of the present invention.

In most instances, it is important for the invention to be structurally strong while remaining low radar cross section for some distance from the non-LRC components. One example of the current invention in an array configuration is shown in FIG. 4. This is a composite laminate configuration but other configurations are also suitable. Other suitable configurations would be a truss structure that is filled with air or other suitable LRC filler such as injected foam.

Referring now to FIG. 4, an embodiment of the carcass of the GPR system is shown, including dielectric antenna arms 41. Antenna arms 41 are connected to the LRC transmitter or receiver components 42, also shown as item 2 of FIG. 1. Transmitter or receiver components 42 receive trigger signals and return data by way of low impedance wires 43. The wires 43, with the term 'wires' used in a general sense to encompass any transmission-line means, are connected to remaining non-LRC portions 44 of the invention.

The array and carcass are fabricated by stacking low radar cross-section sheets of plastic 45, 46 with the adhered electronic components 41, 42, and 43. Sheets of LRC plastic foam separate the LRC sheets of plastic. The LRC plastic sheets protrude into an aluminum or high-strength plastic frame 48. The LRC plastic sheets protrude into the plastic frame and are glued and bolted to angled metal or high strength plastic members 47.

Even though the GPR system is made of low radar cross-section materials in accordance with the present invention, it still has some self-signature. While most of the self signature is due to cross talk and direct coupling between transmitters and receivers, some of the steady state self signature is due to internal reflections. This self-signature confounds the signals that are returned by the environment or targets that are being examined. Direct reflections from non LRC components may advantageously be effectively cancelled with self signature removal. The main benefit of LRC is that it eliminates multiple reflections between the ground and radar. The other important benefit of LRC is the reduction of multi-path interference, which can cause clutter and ringing effects after the returned impulse.

To combat the deleterious effects of a self-signature, a low frequency representation of the self-signature of the antenna or its environment is digitally stored, in accordance with the present invention. Subtraction of the self-signature of an antenna, whether in software or in digital hardware, so as to simplify the computing requirements for signal processing and display of the data, is within the scope of the present invention.

Figure 5:
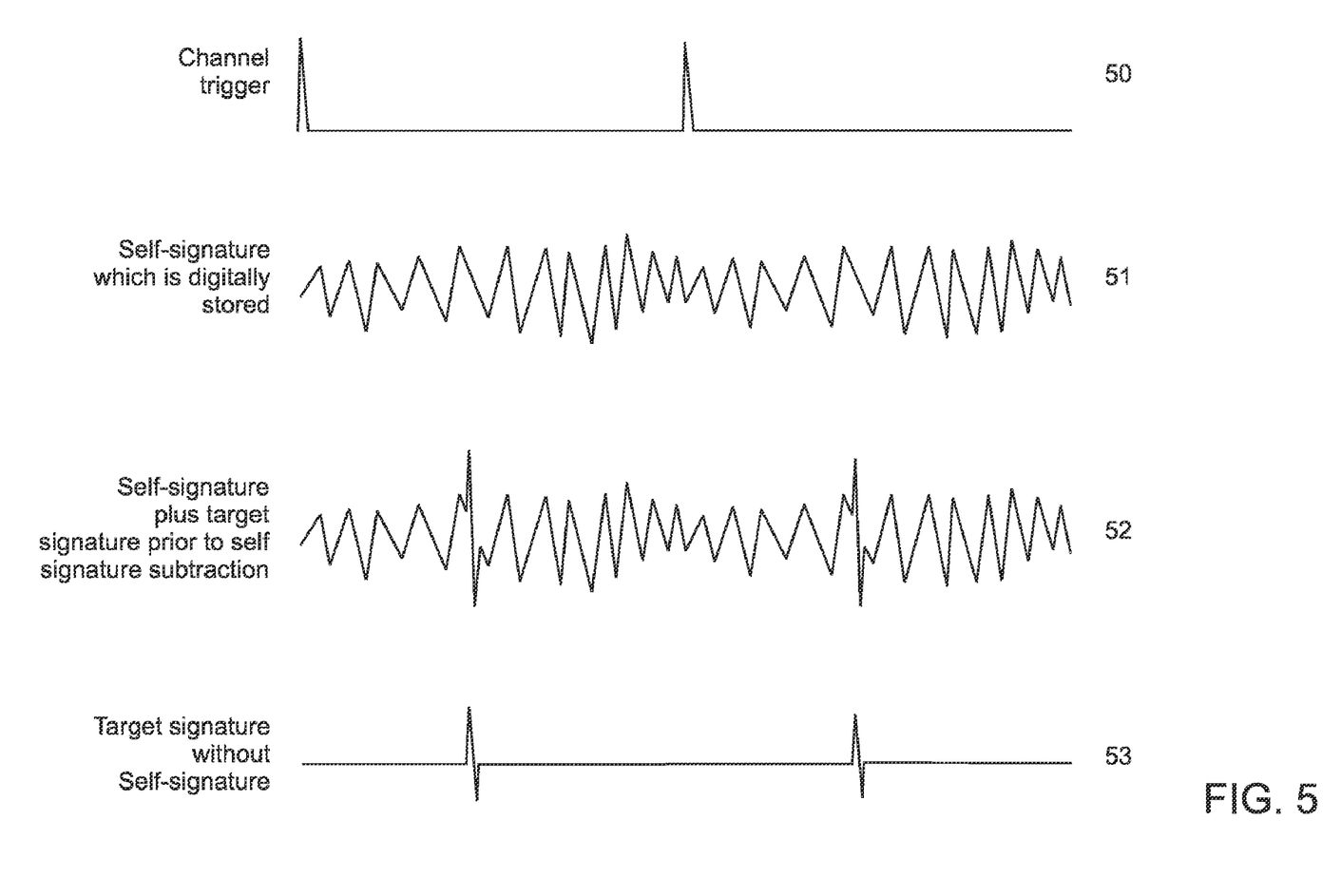
FIG. 5 illustrates the self-signature removal process, in accordance with the present invention.

The self-signature removal and its advantage are illustrated in FIG. 5. In accordance with preferred embodiments of the invention, the self-signature is removed by referencing a trigger 50 that begins each channel of data. The user or automated system causes the invention to store whatever signature is being returned by the array. Prior to storing a reference signature, the antenna is positioned in a reference position such as in the air so it is effectively pointed at nothing but air, then the resulting saved signature is simply the antenna array's self-signature 51. The same procedure can be used to also save the self-signature plus the environment's signature. This procedure may be applied advantageously for a non-intrusive motion detector that might be employed in a see-through-the wall situation.

As the antenna is pointed at an object, the antenna sees the self-signature plus the target signature 52. However, the invention aligns the digitally stored self-signature with the incoming signal 52 and subtracts the stored self signature to report the target signature 53, only.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method for manufacturing a broadband antenna and sampling circuit arrangement, the method comprising:
   a. depositing a conductive film characterized by a resistive impedance along a dielectric member in such a manner that the resistive impedance of the conducting film is a continuous and increasing function of length along the dielectric in each arm of two arms of a vee, as measured from a feedpoint that is located where the arms of the vee are closest to each other; and
   b. disposing the sampling circuit at the feedpoint of the vee and electrically coupling the sampling circuit to the conducting film at the feedpoint of the vee.

2. The method in accordance with claim 1, wherein the step of depositing a conductive film includes sputtering a resistive layer of a conducting metal.

3. The method in accordance with claim 1, wherein the step of depositing a conductive film includes depositing a conductive film in such a manner that the impedance of the conductive film increases substantially linearly with length along the dielectric member.

* * * * *